US008432981B1

(12) United States Patent
An et al.

(10) Patent No.: US 8,432,981 B1
(45) Date of Patent: Apr. 30, 2013

(54) HIGH FREQUENCY AND IDLE COMMUNICATION SIGNAL STATE DETECTION

(75) Inventors: Hongming An, San Diego, CA (US); Wei Fu, San Diego, CA (US); CongQing Xiong, Shenzhen (CN); James Ho, San Diego, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 450 days.

(21) Appl. No.: 12/721,333

(22) Filed: Mar. 10, 2010

(51) Int. Cl.
*H04K 1/10* (2006.01)
*H04M 1/64* (2006.01)
*H04M 1/00* (2006.01)

(52) U.S. Cl.
USPC .............................. 375/260; 379/74; 379/377

(58) Field of Classification Search .................. 375/260; 379/74, 377
See application file for complete search history.

(56) References Cited

U.S. PATENT DOCUMENTS

| | | | | |
|---|---|---|---|---|
| 4,236,048 | A * | 11/1980 | Olney | 379/391 |
| 4,582,957 | A * | 4/1986 | Hayes et al. | 379/74 |
| 4,947,422 | A * | 8/1990 | Smith et al. | 379/200 |
| 5,787,165 | A * | 7/1998 | Lilja et al. | 379/406.07 |
| 5,850,436 | A * | 12/1998 | Rosen et al. | 379/377 |
| 6,477,404 | B1 * | 11/2002 | Yonce et al. | 600/510 |
| 6,650,635 | B1 * | 11/2003 | Weinstein et al. | 370/352 |
| 8,069,287 | B2 * | 11/2011 | Nakano | 710/100 |
| 8,103,886 | B2 | 1/2012 | Irie | |
| 8,176,227 | B2 | 5/2012 | Devam et al. | |
| 2003/0023176 | A1 * | 1/2003 | Yonce et al. | 600/510 |
| 2003/0149459 | A1 * | 8/2003 | Von Arx et al. | 607/60 |
| 2005/0152596 | A1 * | 7/2005 | Walmsley | 382/162 |
| 2007/0180281 | A1 * | 8/2007 | Partovi et al. | 713/320 |

* cited by examiner

*Primary Examiner* — David C. Payne
*Assistant Examiner* — Sarah Hassan
(74) *Attorney, Agent, or Firm* — King & Spalding L.L.P.

(57) ABSTRACT

Various techniques are provided to detect a state of a communication signal. In one example, a method of detecting a state of a signal includes receiving a differential communication signal comprising a positive portion and a complementary negative portion. The method also includes generating a common mode voltage signal from the positive portion and the negative portion of the communication signal. The method also includes rectifying the positive portion and the negative portion of the communication signal to provide a rectified signal. The method also includes comparing the common mode voltage, signal with the rectified signal. The method also includes generating a high frequency detect signal in response to the comparing. The method also includes determining whether the communication signal is in an idle state or a high frequency state based on the high frequency detect signal.

22 Claims, 15 Drawing Sheets

KEY TO FIG. 7

| b<1:0> | d1 | d2 | d3 |
|---|---|---|---|
| 00 | 0 | 0 | 0 |
| 01 | 1 | 0 | 0 |
| 10 | 1 | 1 | 0 |
| 11 | 1 | 1 | 1 |

| | | |
|---|---|---|
| FIG. 10A | FIG. 10B | FIG. 10C |
| FIG. 10D | | |

KEY TO FIG. 10

HIGH FREQUENCY AND IDLE COMMUNICATION SIGNAL STATE DETECTION

BACKGROUND

1. Field of the Invention

The present invention generally relates to signal detection more particularly to the detection of high frequency and idle states of a communication signal.

2. Related Art

Various types of communication standards, such as universal serial bus (USB) 2.0 or USB 3.0 standards, may be used for communication between devices for tasks such as data storage, communications, printer/scanner connections, and other tasks. Data communication between such devices generally takes place using a variety of communication signals having a variety of signal states. For example, a communication signal may be in an idle state where little or no data is communicated, a low frequency state (e.g., a low frequency periodic signaling (LFPS) state during the performance of a handshake protocol) where devices are awakened or initialized and trained for features such as power management, or a high frequency state (e.g., a hi-speed (USB 2.0) state or a Super Speed (USB 3.0) state) where data is communicated at high data rates between devices.

However, detection of the different states of the data communication signals using existing detection techniques is often difficult. Accordingly, there is a need for an improved approach to signal detection.

SUMMARY

Various techniques are provided for detecting a state of a communication signal. For example, in one embodiment, a method of detecting a state of a signal includes receiving a differential communication signal comprising a positive portion and a complementary negative portion. The method also includes generating a common mode voltage signal from the positive portion and the negative portion of the communication signal. The method also includes rectifying the positive portion and the negative portion of the communication signal to provide a rectified signal. The method also includes comparing the common mode voltage signal with the rectified signal. The method also includes generating a high frequency detect signal in response to the comparing. The method also includes determining whether the communication signal is in an idle state or a high frequency state based on the high frequency detect signal.

In another embodiment, a device adapted to detect a state of a signal includes nodes adapted to receive a differential communication signal comprising a positive portion and a complementary negative portion. The device also includes a voltage divider circuit adapted to generate a common mode voltage signal from the positive portion and the negative portion of the communication signal. The device also includes a rectifier circuit adapted to rectify the positive portion and the negative portion of the communication signal to provide a rectified signal. The device also includes a comparator adapted to perform a comparison between the common mode voltage signal and the rectified signal, and adapted to generate a high frequency detect signal in response to the comparison to indicate whether the communication signal is in an idle state or a high frequency state.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments further described herein, various techniques are provided to detect a state of a communication signal, such as an idle state, a low frequency state (e.g., LFPS state), and/or a high frequency state (e.g., hi-speed state or Super Speed state) of the communication signal. Although such techniques are primarily described herein with regard to USB 3.0 devices and communications, other systems may also be used in various embodiments.

Figure 1:
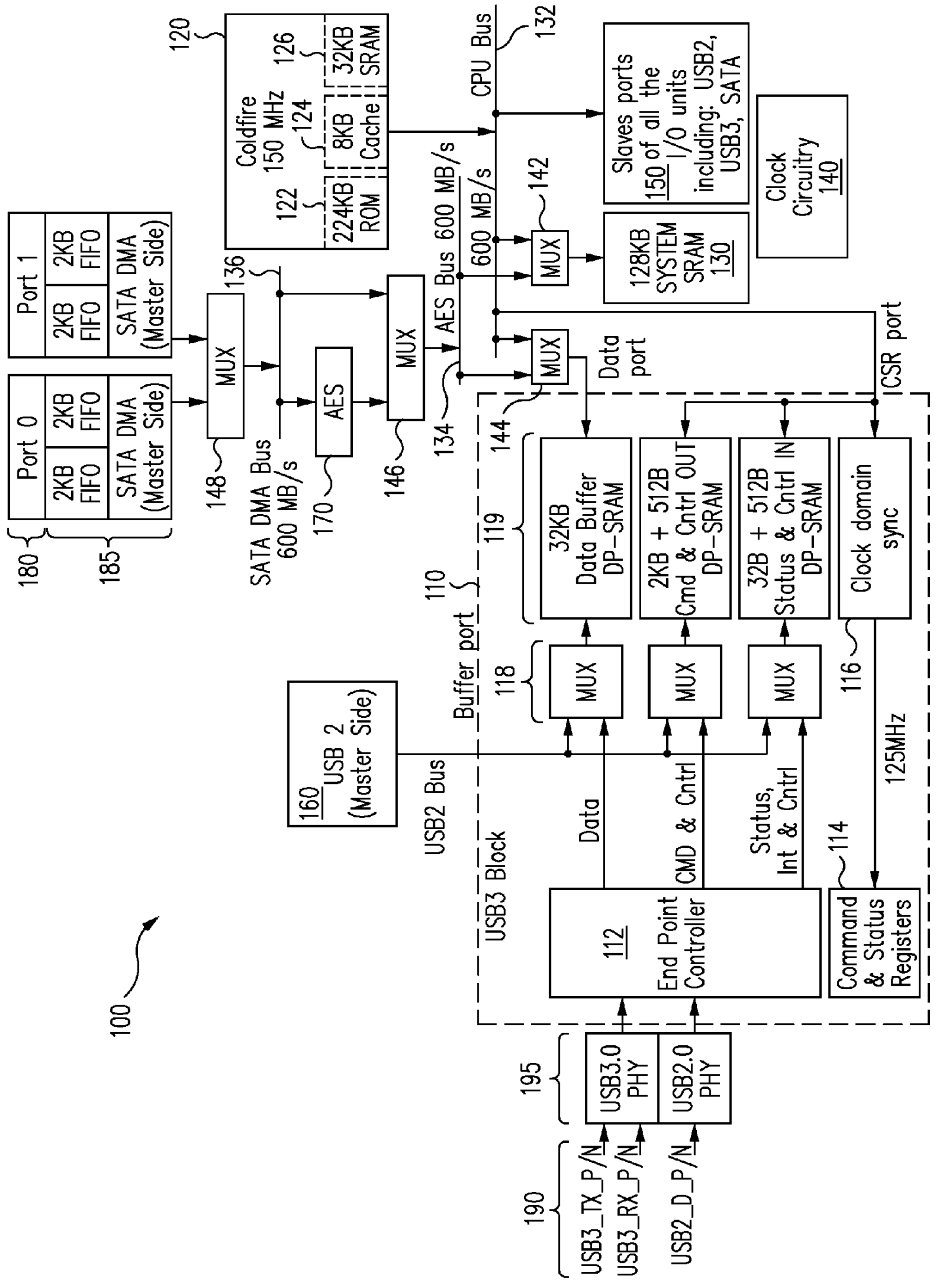
FIG. 1 illustrates a block diagram of a system which may be used to interface with a variety of different devices over various ports in accordance with an embodiment of the present invention.

FIG. 1 illustrates a block diagram of a system 100 which may be used to interface with a variety of different devices over various ports. In one embodiment, system 100 may be implemented as a system on a chip that manages communications between a host device and one or more other devices.

For example, system 100 may be used to provide bridging, hosting, and/or hub operations in accordance with various communication protocols.

System 100 includes a device controller 110, a processor 120, system memory 130, clock circuitry 140, slave ports 150, a configuration port 160, an encryption block 170, communication ports 180, physical layer components 185, communication ports 190, and physical layer components 195.

As shown in FIG. 1, system 100 includes various busses 132, 134, and 136, and multiplexers 142, 144, 146, and 148 to facilitate communications between device controller 110, processor 120, system memory 130, slave ports 150, encryption block 170, physical layer components 185, and physical layer components 195.

Device controller 110 may be configured to manage communications to and from physical layer components 195 associated with communication ports 190. For example, device controller 110 may be used to host one or more devices connected to communication ports 190. In one embodiment, device controller 110 may be implemented as a universal serial bus (USB) controller configured to permit system 100 to operate as a USB host to one or more USB slave devices connected to communication ports 190. As shown in FIG. 1, device controller 110 includes an end point controller 112, command and status registers 114, a clock domain synchronization block 116, multiplexers 118, and various memory blocks and buffers 119.

Processor 120 may be implemented, for example, as a Coldfire processor operating at 150 MHz with various associated memories and caches 122, 124, and 126. Processor 120 may be used, for example, to perform various bridging, hosting, and/or hub operations for communications exchanged between communication ports 180 and 190 as well as slave ports 150.

System memory 130 may be used by processor 120 and/or other components of system 100 to support the various operations of system 100. Clock circuitry 140 may be used to provide one or more clock signals to system 100. Slave ports 150 may be used to interface system 100 with various types of slave devices as may be desired in various implementations. Configuration port 160 may be implemented, for example, as a USB 2.0 port used to configure system 100 for desired operations. Encryption block 170 may be implemented, for example, to perform Advanced Encryption Standard (AES) encryption on data passed between communication ports 180 and the rest of system 100.

Communication ports 180 may be implemented, for example, as storage media device ports configured to support communications with storage media devices such as hard drives, flash drives (e.g., thumb drives, solid state drives, or others), optical storage media (e.g., CD-ROM, DVD, HD-DVD, Blu-Ray, or others), or other appropriate storage media devices. Such storage media device ports may be implemented in accordance with Serial Advanced Technology Attachment (SATA) interfaces, external SATA (eSATA) interfaces, Parallel Advanced Technology Attachment (PATA) interfaces, flash memory interfaces, or others. In the embodiment shown in FIG. 1, communication ports 180 are implemented as SATA interfaces. Physical layer components 185 may be used to facilitate communications between communication ports 180 and the rest of system 100.

Communication ports 190 may be implemented, for example, in accordance with various communication standards such as, for example, USB 3.0, USB 2.0, Firewire (e.g., IEEE 1394), or others. In the embodiment shown in FIG. 1, communication ports 190 are implemented as USB 2.0 and USB 3.0 ports. Physical layer components 195 may be used to facilitate communications between communication ports 190 and the rest of system 100.

In one embodiment, an external host device may be connected to one of communication ports 190. In this embodiment, system 100 may be configured to host one or more devices connected to communication ports 180 and/or 190 on behalf of the host device. In this regard, system 100 may facilitate communications between the host device and/or the various hosted devices.

In various embodiments, physical layer components 195 may include appropriate components and related circuitry to support the detection of idle states, low frequency states, and/or high frequency states of communication signals received from external devices coupled to communication ports 190. For example, various embodiments provided by the present disclosure may be used to detect various signaling states, such as a low frequency state or out-of-band (OOB) signaling during the performance of a handshake protocol between communication ports (e.g., communication ports 190) across a communication link. In an embodiment, such detection may be performed when such a communication link is under training. For example, when communication begins between host and receiver devices, such as USB 3.0 communication between USB 3.0 devices, a host device may provide a communication signal in a low frequency state to wake up a receiver device from a sleep state. The low frequency detection circuitry in the receiver device may detect the low frequency state and generate a low frequency detect signal (discussed below with regard to signals 314 and 316 in graph 302 of FIG. 3) to wake up the receiver device.

Figure 2:
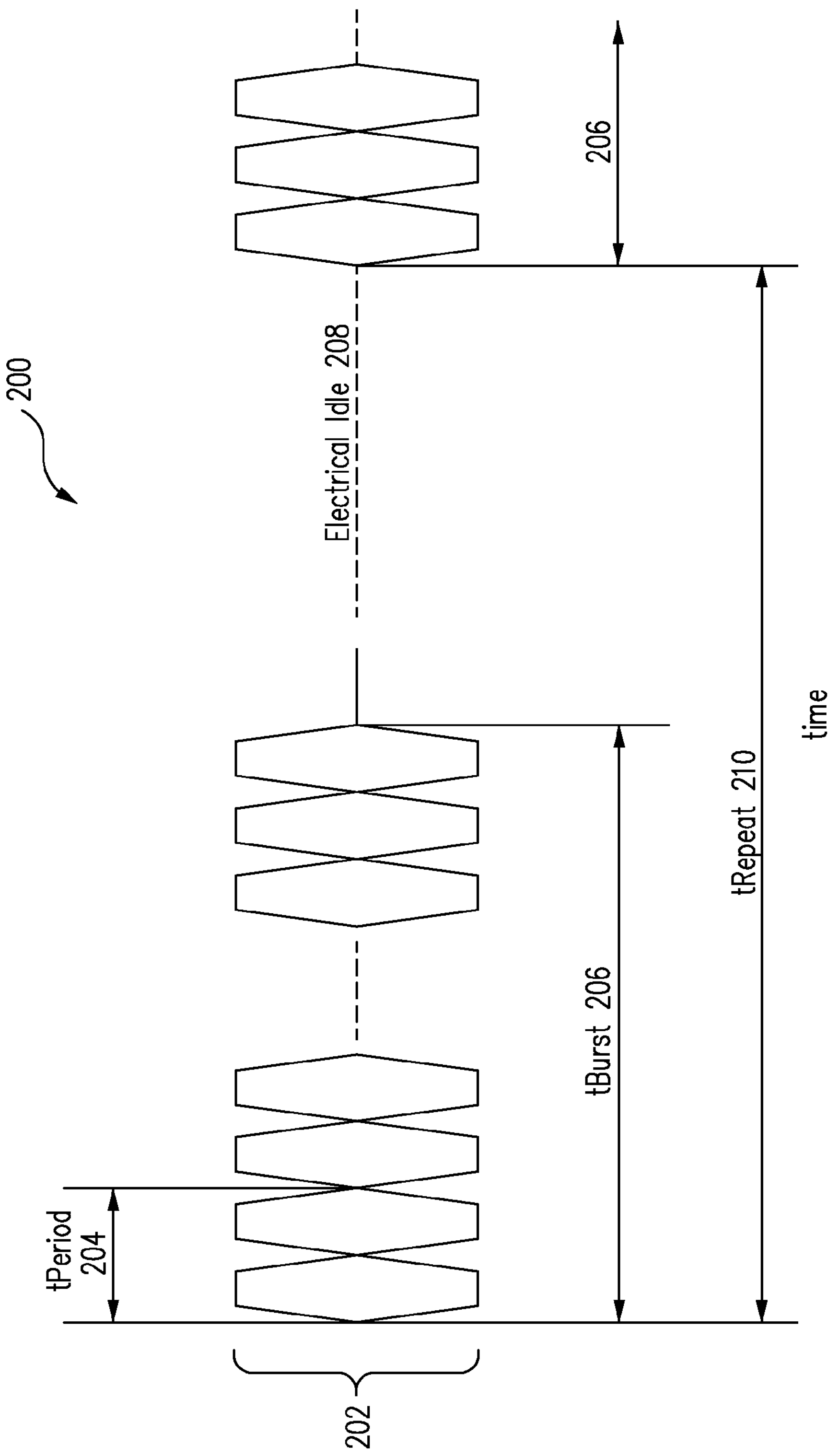
FIG. 2 illustrates a graph showing a transient response of a communication signal having a low frequency state and an idle state in accordance with an embodiment of the present invention.

FIG. 2 illustrates a graph 200 (time vs. amplitude (V)) showing a transient response of a communication signal 202 having a period 204 in accordance with an embodiment of the present invention. In an embodiment, communication signal 202 may be a differential communication signal received by system 100 from a device connected to communication ports 190 in accordance with the USB 3.0 specification. The communication signal 202 has a low frequency state 206 (also referred to as tBurst or burst time) and an idle state 208 (also referred to as Electrical Idle). The low frequency state 206 and the idle state 208 may repeat over a time tRepeat 210. The communication signal 202 in the low frequency state 206 is a differential signal having a positive portion (also referred to as Txp at the signal transmitter) and a complementary negative portion (also referred to as Txn at the signal transmitter) for transmitting information electrically using two complementary signals sent on two separate paths.

According to the USB 3.0 specification, when a receiver termination is present, but no signaling is occurring on the differential signal communication link, the communication signal associated with the communication link is considered to be in the idle state 208. The communication signal may transition between the idle state 208 and a low frequency 206 state to signal initialization and power management information. Accordingly, as shown in FIG. 2, the idle state 208 is between two contiguous low frequency 206 bursts. In one embodiment, low frequency signaling may be detected using very little power.

The idle state 208 is a steady state condition where the voltages of signals TXp and TXn corresponding to communication signal 202 are held substantially constant at substantially the same value. For example, in an embodiment, the idle state 208 may correspond to a power saving mode. As should be understood for devices communicating the signals shown in FIG. 2, a low impedance common state and differential receiver termination values are to be met in the idle state 208.

For example, in one embodiment, for USB communications between a host device and a receiver device, the receiver input may be terminated and in a low impedance state to permit a communication link to be established and maintained between the host device and the receiver device. A transmitter may be in either a low or a high impedance state during an idle state 208.

Figure 3:
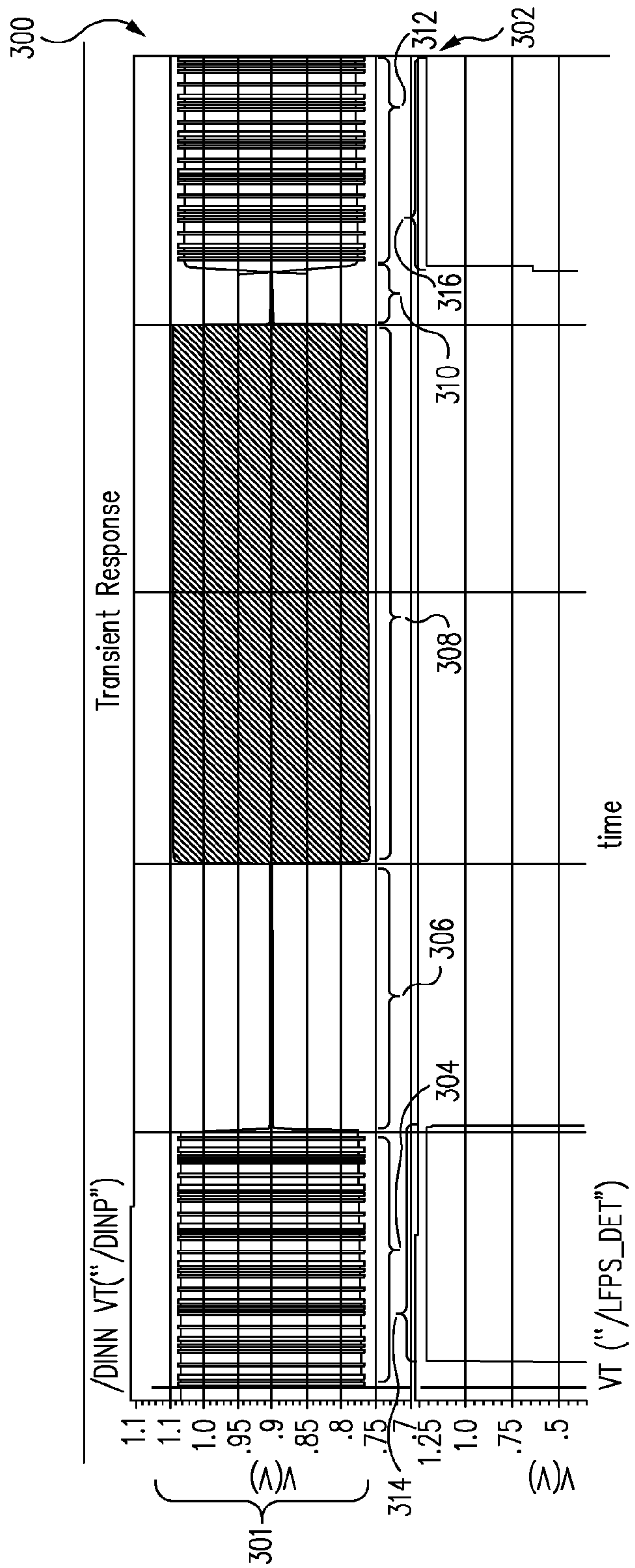
FIG. 3 illustrates a graph showing a transient response of a communication signal having low frequency states, idle states, and a high frequency state, and a graph showing an output of a device detecting when the communication signal is in the low frequency state, in accordance with an embodiment of the present invention.

FIG. 3 illustrates a graph 300 (time vs. amplitude (V)) showing a transient response of a communication signal 301 having low frequency states 304 and 312, idle states 306 and 310, and a high frequency state 308 in accordance with an embodiment of the present invention. In an embodiment, communication signal 301 may be a differential communication signal received by system 100 from a device connected to communication ports 190 in accordance with the USB 3.0 specification. FIG. 3 also illustrates a graph 302 (time vs. amplitude (V)) showing output signals 314 and 316 of a circuit device (e.g., a detector of system 100) detecting when the communication signal in graph 300 is in the low frequency states 304 and 312, respectively. As should be understood, there is a short time delay between when the beginning of the low frequency state 304 and beginning of the detection signal 314. Similarly, there is a short time delay between when the beginning of the low frequency state 312 and beginning of the detection signal 316. In an embodiment, the low frequency signal is a low power signal having a frequency in a range of approximately 10 MHz to approximately 50 MHz. Also, in an embodiment, the high frequency signal has a data rate of up to approximately 5 Gbps.

Figure 4:
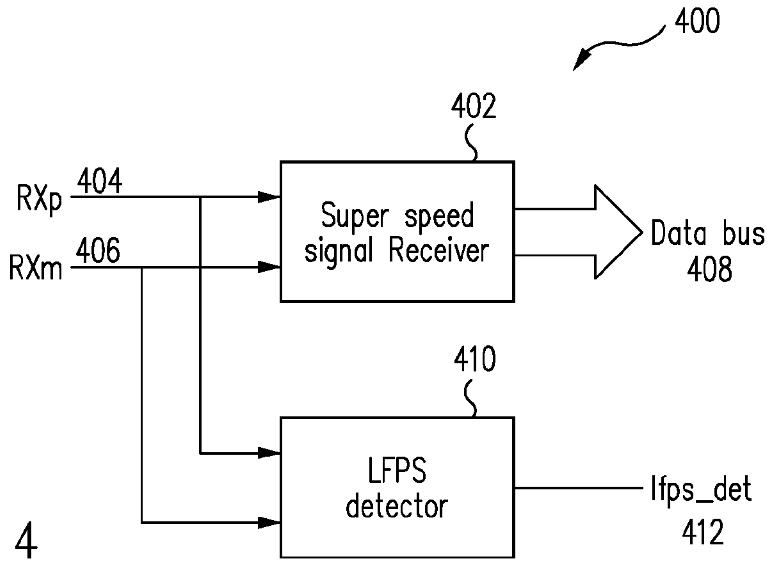
FIG. 4 illustrates a block diagram of a high frequency signal receiver and a low frequency signal detector in accordance with an embodiment of the present invention.

FIG. 4 illustrates a block diagram of a system 400 including a high frequency signal receiver 402 and a low frequency signal detector 410 in accordance with an embodiment of the present invention. A host device transmitter provides signals TXp and TXn which collectively provide a communication signal (e.g., communication signal 202 or 301) to one or more of communication ports 190 of system 100. Signals TXp and TXn are received as incoming differential signals RXp (also referred to as DINP) and RXm (also referred to as RXn or DINN) at nodes 404 and 406, respectively, and provided to the high frequency signal receiver 402 and the low frequency signal detector 410. As should be understood, the high frequency signal receiver 402 receives the communication signal and passes the data from the high frequency state 308 along a parallel data bus 408 to other devices. In an embodiment, the high frequency signal receiver 402 may output a logic high value in all states, even when the incoming signal is in an idle state (e.g., state 306).

The high frequency signal receiver 402 (e.g., implemented in a data path of system 100) receives the communication signal in a high frequency state (e.g., state 308) at nodes 404 and 406, performs a demultiplexing (e.g., demux) operation, and transmits the communication signal along the parallel data bus 408. In an embodiment, the high frequency signal receiver 402 may only operate when the communication signal exhibits a high frequency state (e.g., state 308).

The low frequency signal detector 410 monitors the incoming differential signals RXp and RXm, and outputs a low frequency detect signal (also referred to as lfps_det) 412 as a logic low value (e.g., a 0 value) or a logic high value (e.g., a 1 value). In an embodiment, the low frequency signal detector 410 provides a logic low value when either an idle state (e.g., state 306) or a high frequency state (e.g., state 308) is detected, and provides a logic high value when a low frequency state (e.g., state 304 or 312) is detected. For example, in an embodiment, the low frequency signal detector 410 detects when the communication signal is in the low frequency state (e.g., state 304) in a range of approximately 10 MHz to approximately 50 MHz and having a differential peak-to-peak voltage amplitude from approximately 300 mV to approximately 1.2 V. In an embodiment, the low frequency signal detector 410 may operate in any of the signal states, such as the low frequency state 304, the idle state 306 or the high frequency state 308.

Figure 5:
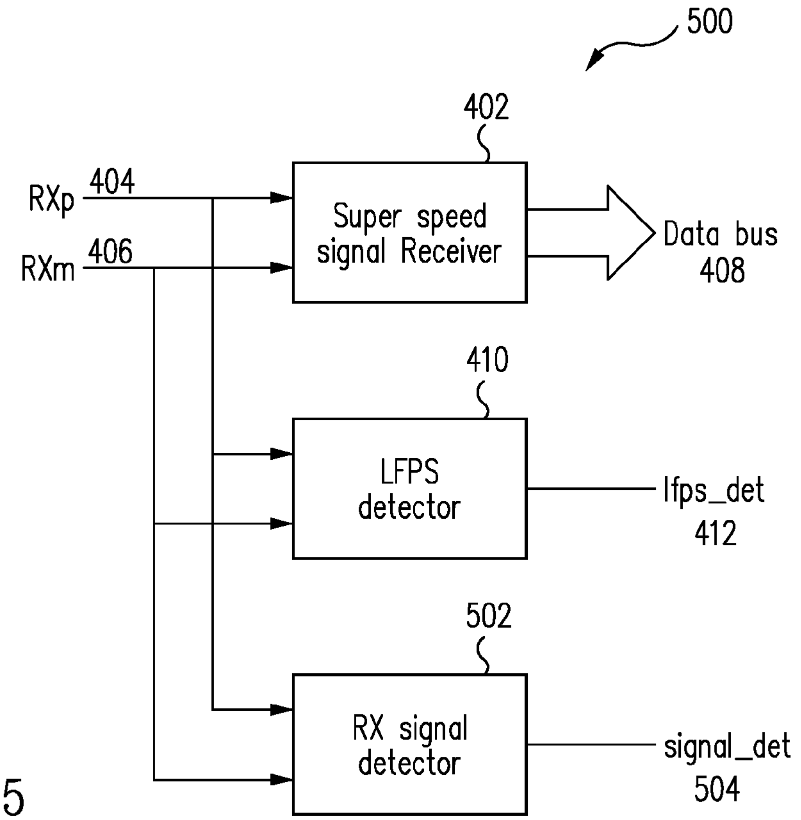
FIG. 5 illustrates a block diagram of a high frequency signal receiver, a low frequency signal detector, and an idle/high frequency signal detector in accordance with an embodiment of the present invention.

FIG. 5 illustrates a block diagram of a system 500 including the high frequency signal receiver 402, the low frequency signal detector 410, and an idle/high frequency signal detector 502 in accordance with an embodiment of the present invention. The idle/high frequency signal detector 502 detects whether the incoming communication signal is in an idle state (e.g., state 306) or a high frequency state (e.g., state 308) and outputs a high frequency detect signal (also referred to as signal_det) 504 as a logic low value or a logic high value, depending on the state in which the communication signal is operating. For example, in an embodiment, if the communication signal is in an idle state (e.g., 306), the high frequency detect signal 504 is a logic low value, and when the communication signal is in a high frequency state (e.g., state 308), the high frequency detect signal 504 is a logic high value.

In an embodiment, the idle/high frequency signal detector 502 detects the strength of the communication signal. If the input signal swing is larger than a pre-defined threshold value (e.g., >300 mV), then the high frequency detect signal 504 provides a logic high value, otherwise it provides a logic low value. In other words, the idle/high frequency signal detector 502 detects when the communication signal is not in the idle state (e.g., state 306). The idle/high frequency signal detector 502 may operate in any of the signal states, such as the low frequency state 304, the idle state 306 or the high frequency state 308.

Accordingly, detection of the idle state (e.g., state 306) may be performed using two bits provided by the combination of the low frequency signal detector 410 (one logic bit), and the idle/high frequency signal detector 502 (one logic bit). Accordingly, if the low frequency detect signal 412 provides a logic high value, then the incoming signal is operating in the low frequency state in a range of approximately 10 MHz to approximately 50 MHz (e.g., state 304), and the high frequency detect signal 504 is irrelevant. On the other hand, if the low frequency detect signal 412 provides a logic low value, then the state of the high frequency detect signal 504 indicates whether the incoming signal is in either the idle state (e.g., high frequency detect signal 504 provides a logic low value) or whether the incoming signal is in the high frequency state (e.g., high frequency detect signal 504 provides a logic high value up to 5 Gbps).

Figure 6A:
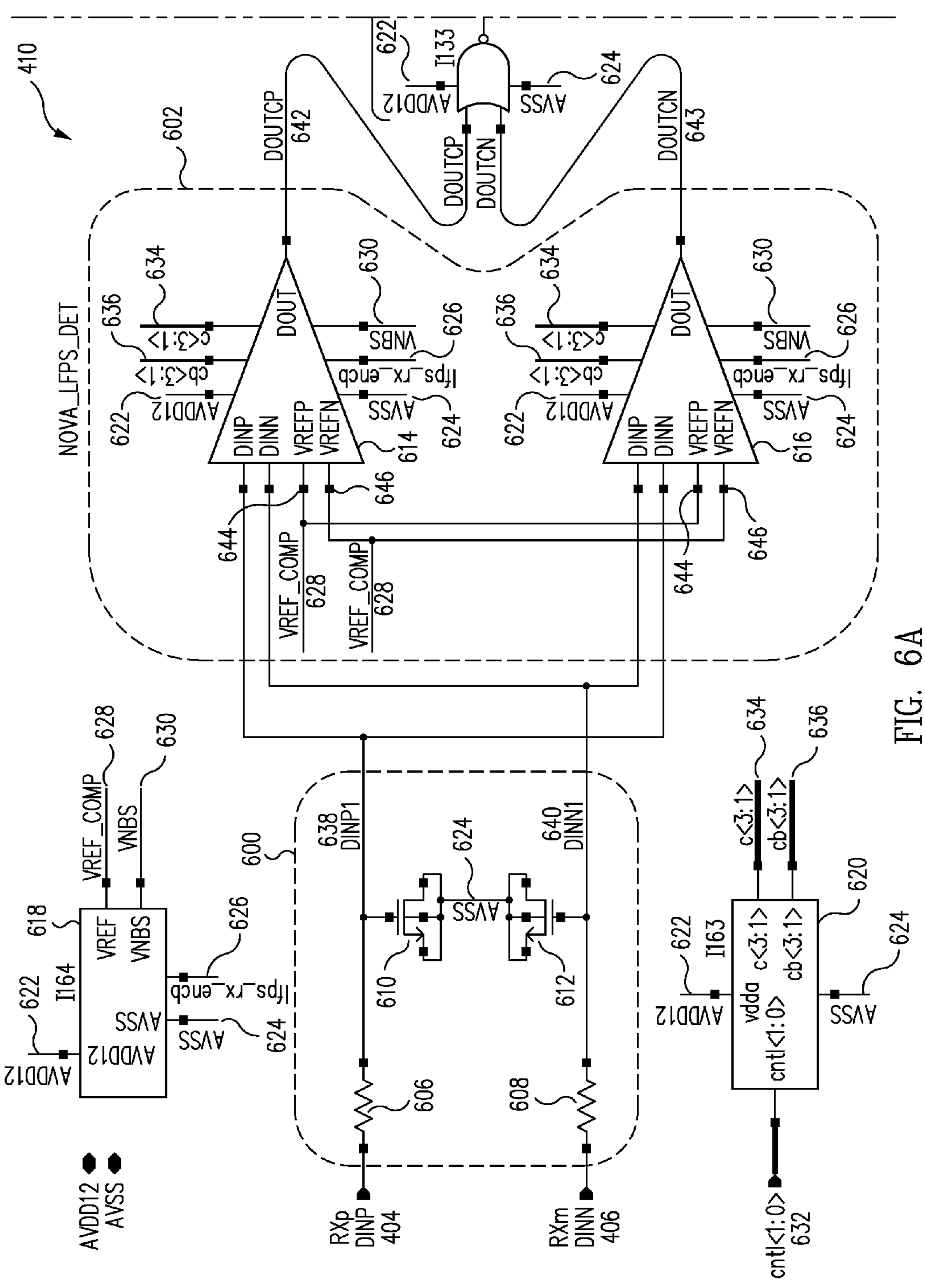
FIG. 6 illustrates a schematic diagram of the low frequency signal detector of FIG. 5 in accordance with an embodiment of the present invention.
Figure 6B:
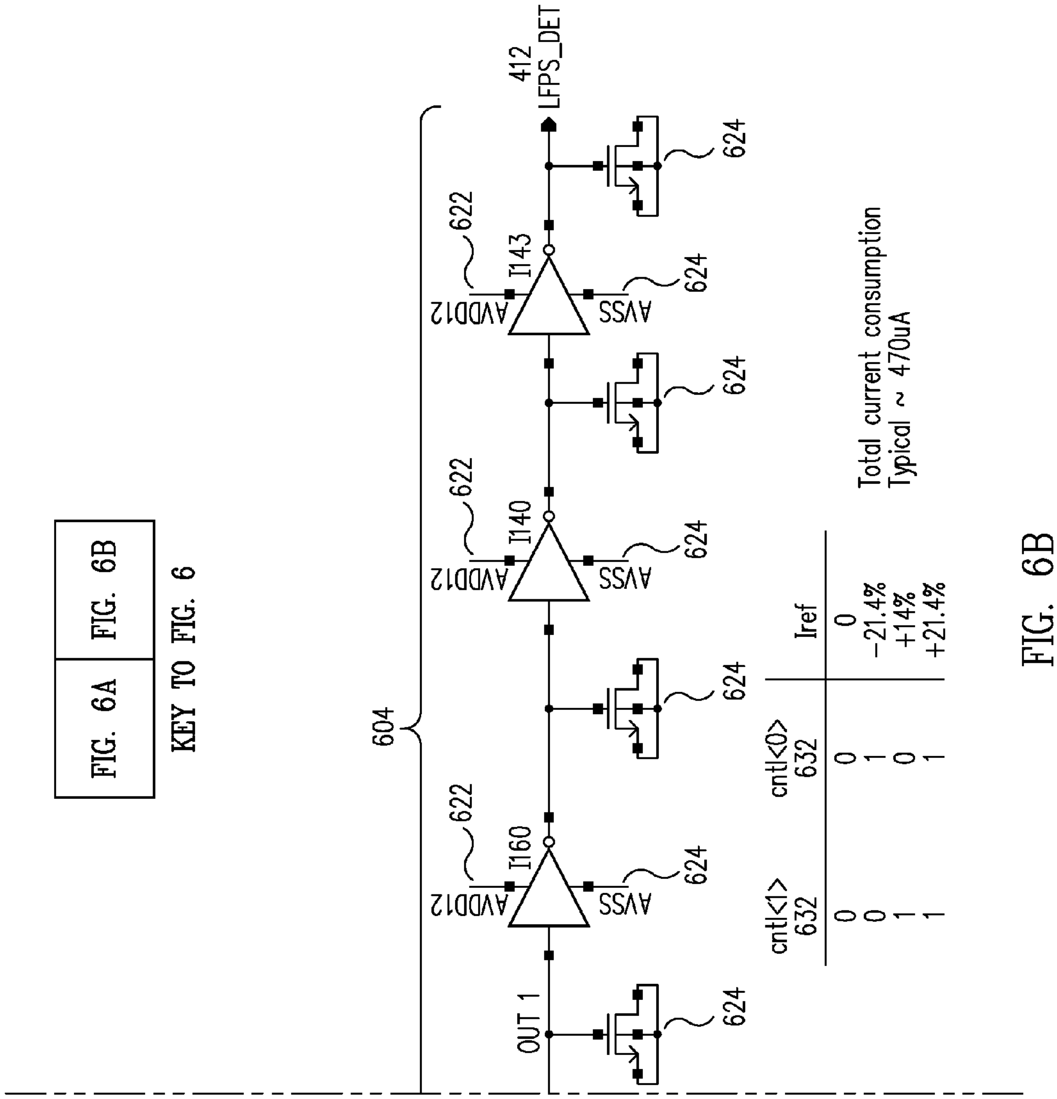
Figure 7A:
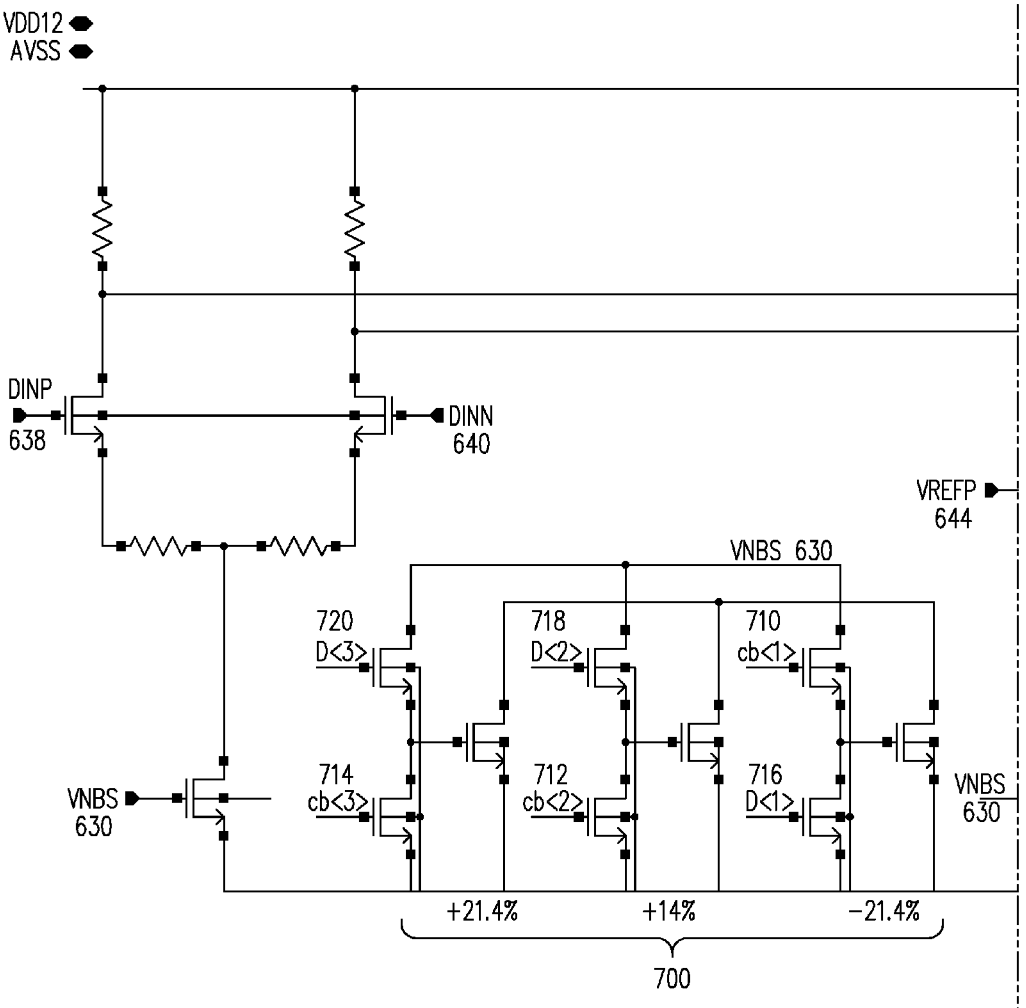
FIG. 7 illustrates a schematic diagram of a comparator of FIG. 6 to compare differential inputs against an internal reference voltage in accordance with an embodiment of the present invention.
Figure 7A:
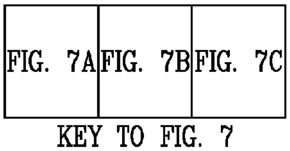
Figure 7B:
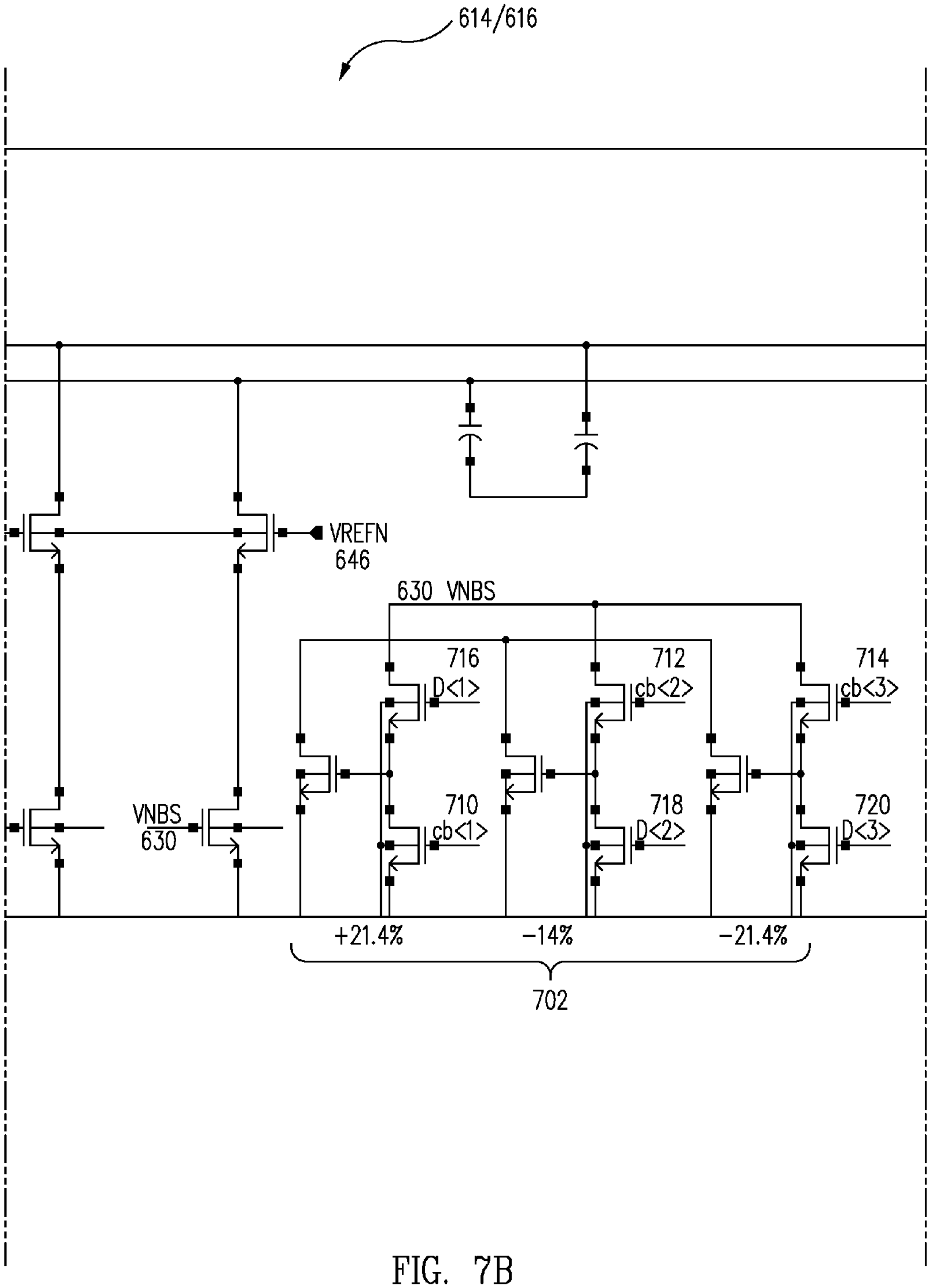
Figure 7C:
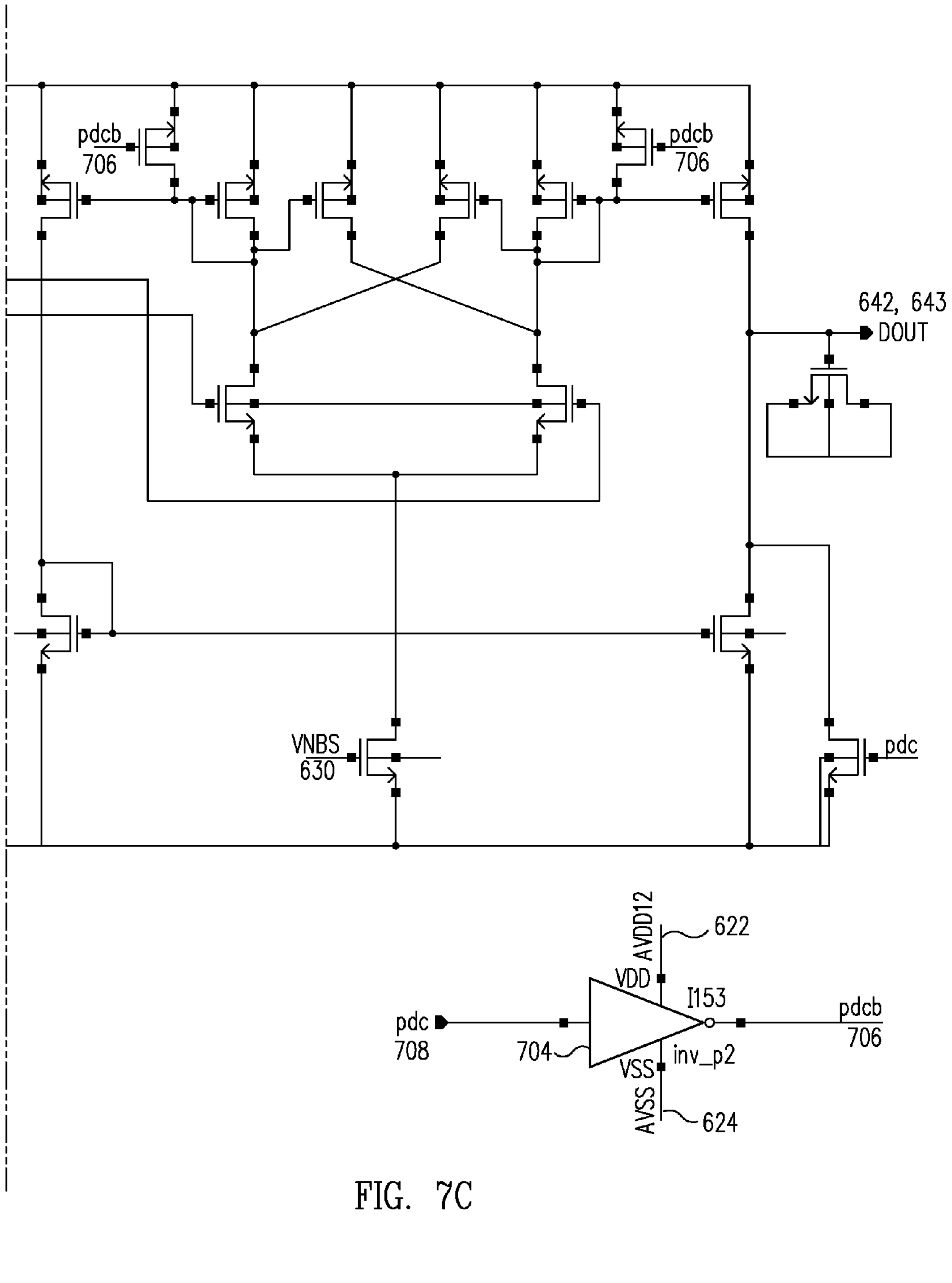

FIG. 6 illustrates a schematic diagram of a circuit representing the low frequency signal detector 410 in accordance with an embodiment of the present invention. It is contemplated that the low frequency signal detector 410 may be used as part of or in conjunction with a USB device, such as a USB 3.0 device. In an embodiment, the low frequency signal detector 410 detects OOB signaling and signal frequencies in the range of approximately 10 MHz to approximately 50 MHz having a differential peak-to-peak amplitude signal greater than approximately 300 mV and therefore outputs a logic high value at the low frequency detect signal 412. Additionally, an embodiment of the low frequency signal detector 410 rejects the high frequency signal (e.g., a USB 3.0 Super Speed signal of approximately 5 Gbps as indicated at the high frequency state 308), and outputs the low frequency detect signal as a logic low value. Also, an embodiment of the low frequency signal detector 410 rejects the incoming signal having a differential peak-to-peak amplitude signal below approximately 100 mV or electrical idle signal and outputs the low frequency detect signal as a logic low value.

As shown in FIG. 6, the low frequency signal detector 410 includes an R/C filter circuit 600 receiving the communication signal (e.g., the signal as shown in the graph 300 of FIG. 3) at input nodes 404 and 406. In one embodiment, the R/C filter circuit 600 filters the communication signal to provide a filtered signal that includes frequencies less than approximately 50 MHz (e.g., including the frequency range of approximately 10 MHz to approximately 50 MHz corresponding to the typical frequency range of LFPS states in USB 3.0 communication signals). The R/C filter circuit 600 passes the filtered signal to a comparator 602. The comparator 602 provides outputs to logic 604 (e.g., logic gates). Logic 604, in turn, provides the low frequency detect signal 412.

The R/C filter circuit 600 includes resistors 606 and 608 coupled respectively with transistors 610 and 612. Electrical buss AVSS 624 is coupled between transistors 610 and 612. The R/C filters in circuit 600 are low pass filters that are adapted to reject the high frequency signals (e.g., high frequency signals at state 308) from the input nodes 404 and 406. The outputs of the low pass filters (e.g., shown as DINP1 638 and DINN1 640) are passed to inputs of the comparators 614 and 616. The comparators 614 and 616 compare the signals at DINP1 638 and DINN1 340 with an internal reference voltage provided by internal reference voltage generator 618 (explained in more detail below). Comparator 614 compares the positive data input data at DINP 1 638 with the internal reference voltage provided by the generator 618 and outputs a logic output DOUTCP at node 642. Comparator 616 compares the negative input data at DINN1 640 with the internal reference voltage provided by the generator 618 and outputs a logic output DOUTCN at node 643. Logic 604 receives the comparator outputs at nodes 642 and 643 and performs an OR logic operation on the signal, with accompanying buffering devices as shown, and outputs the low frequency detect signal 412. In other words, if the incoming signal has a frequency that is too high (e.g., greater than approximately 50 MHz indicating the high frequency state 308), then the low frequency signal 412 will exhibit a logic low value.

FIG. 6 also shows the reference generator having nodes AVDD 622, AVSS 624, lfps_rxencb 626, VREF_COMB (also referred to as VREF) 628 and VNBS 630. The encoder 620 receives input logic values at node cntl<1:0>632 to perform encoding operations at output node c<3:1>634 and output node cb<3:1>636, in accordance with the truth table of FIG. 6 showing input logic values at node 632 and reference current Iref.

Figure 8:
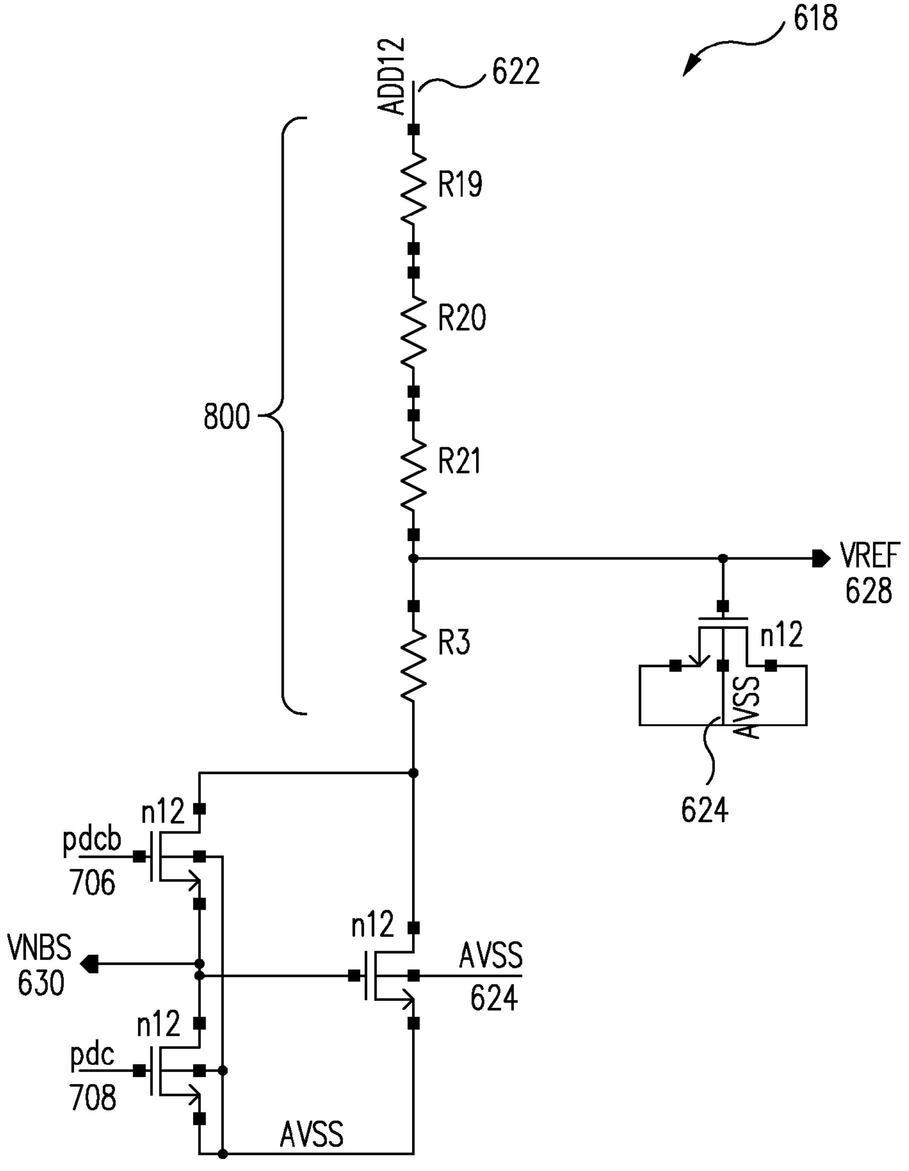
FIG. 8 illustrates a schematic diagram of a reference voltage generator of FIG. 6 in accordance with an embodiment of the present invention.
Figure 9:
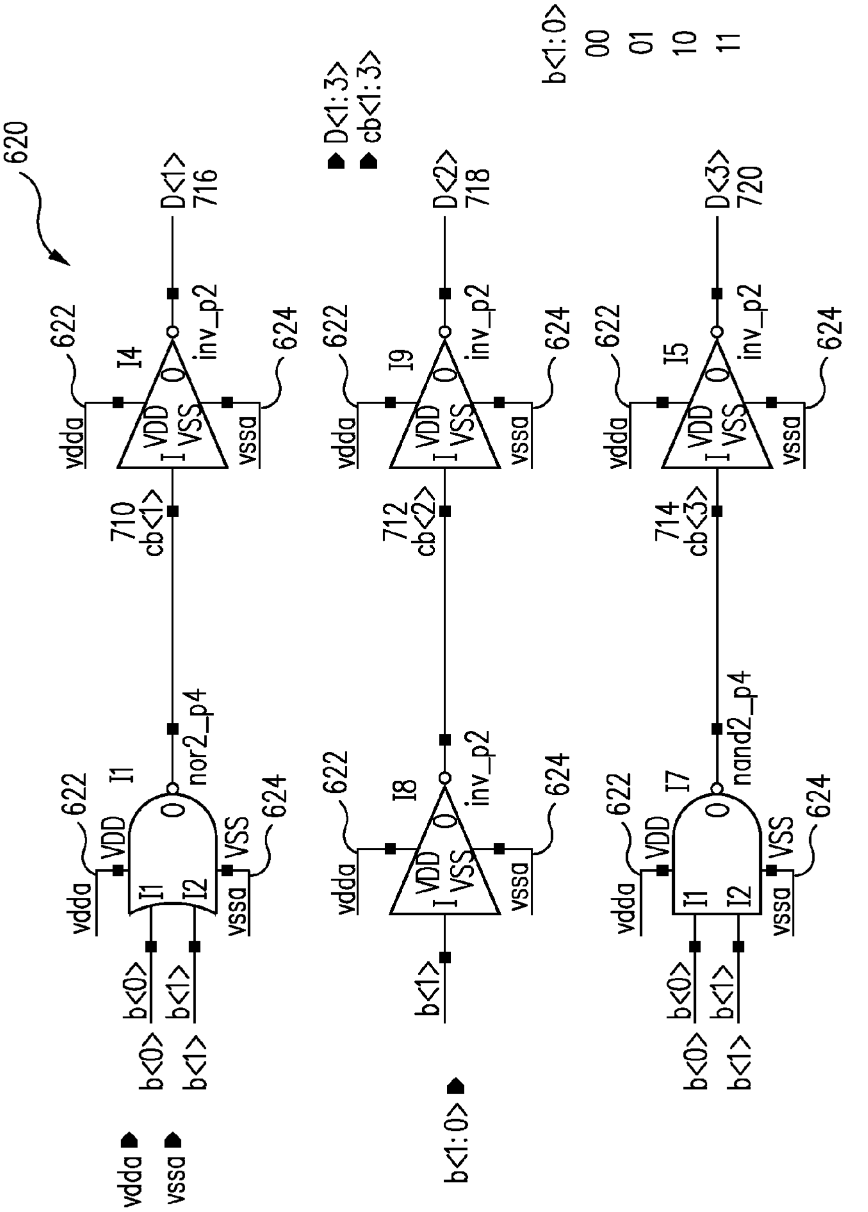
FIG. 9 illustrates a schematic diagram of an encoder of FIG. 6 for adjustment of the internal reference voltage in accordance with an embodiment of the present invention.
Figure 10A:
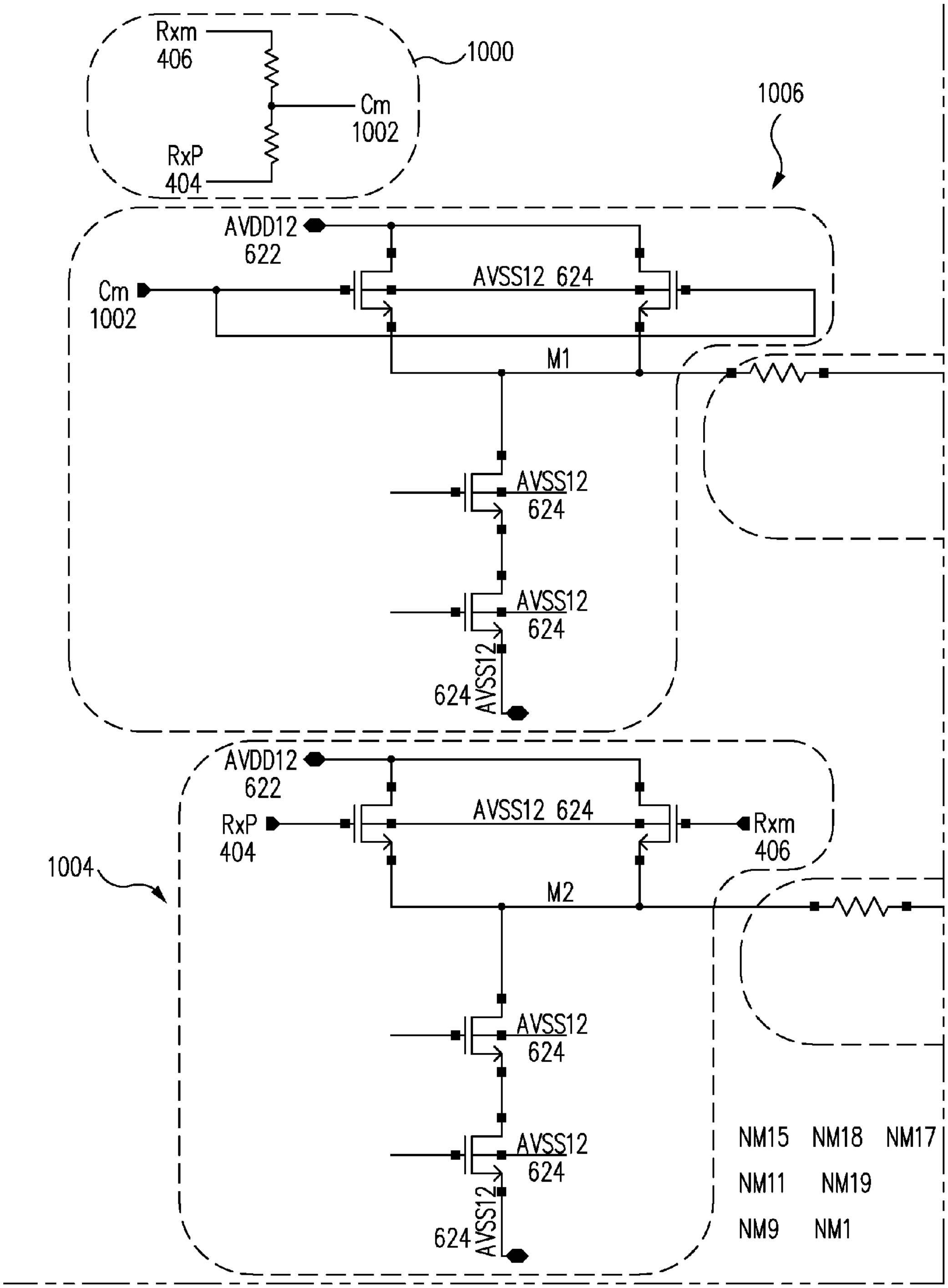
FIG. 10 illustrates a schematic diagram of the idle/high frequency signal detector of FIG. 5 in accordance with an embodiment of the present invention.
Figure 10B:
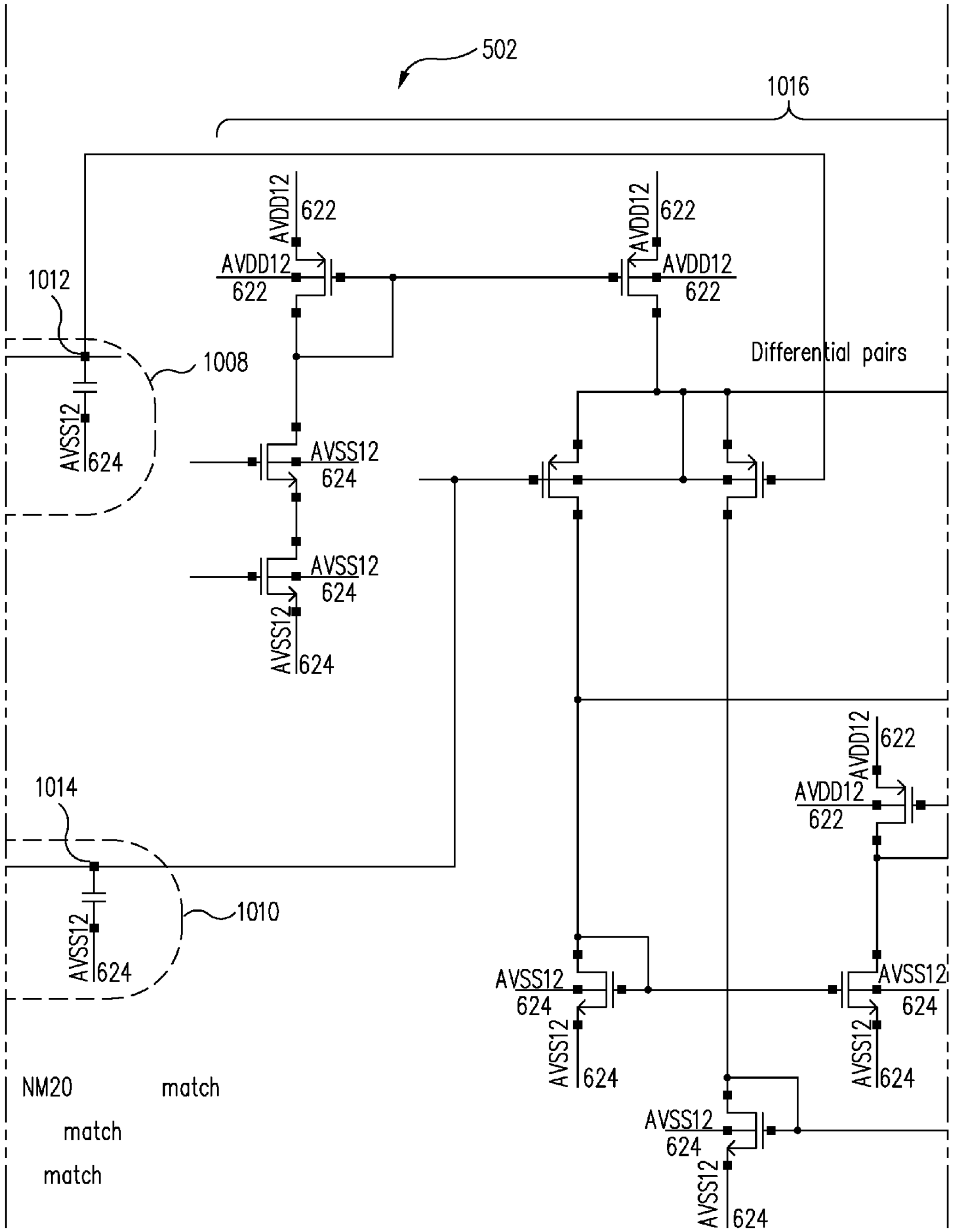
Figure 10C:
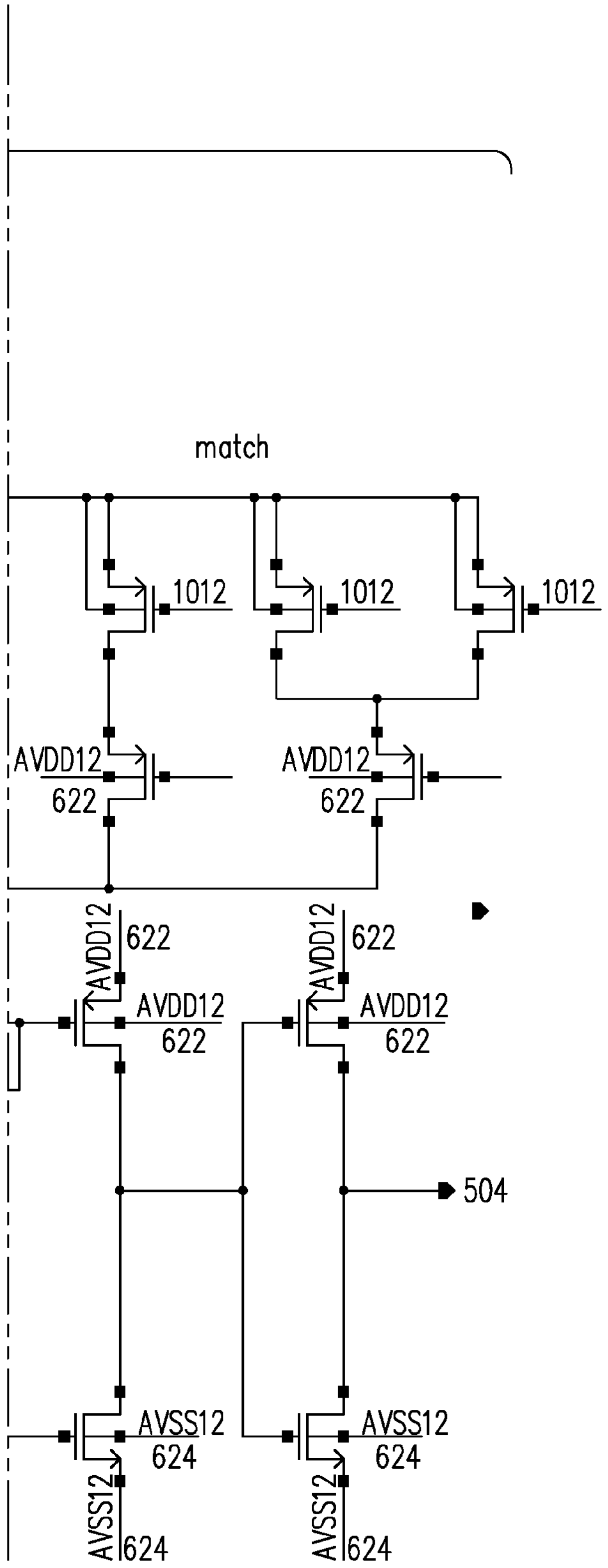
Figure 10D:
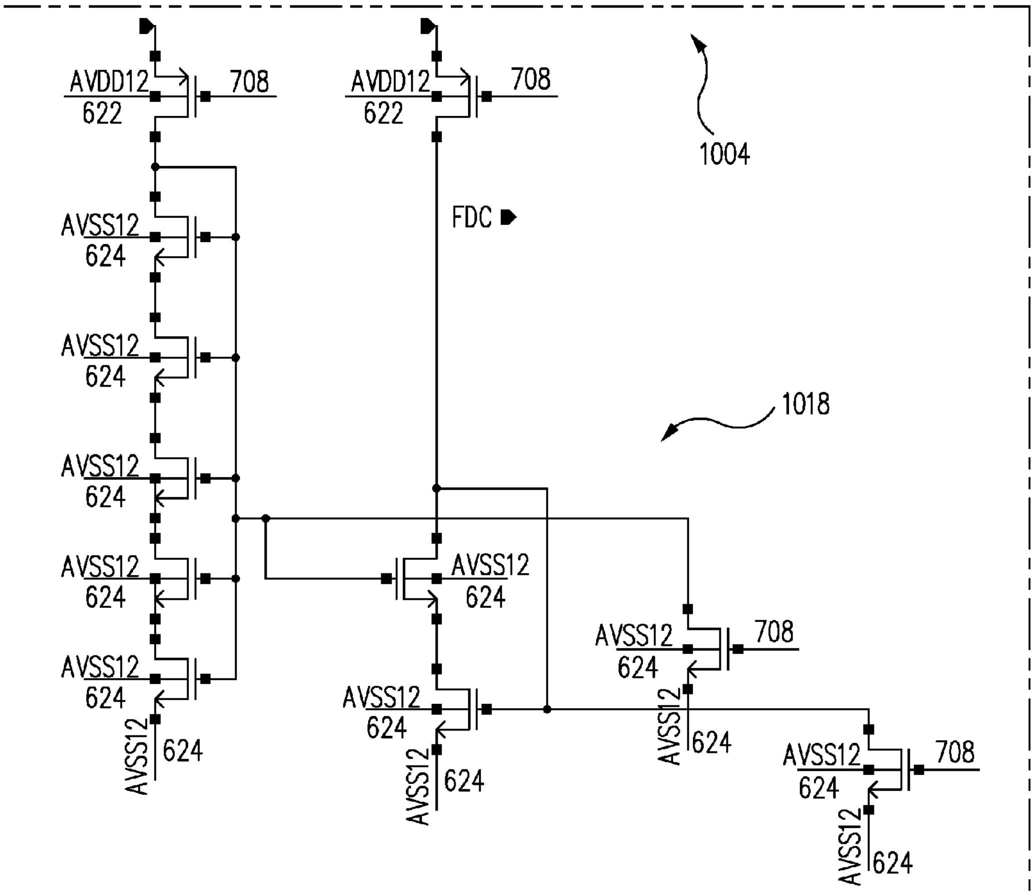

Other relevant components of FIG. 6 are shown in further detail in FIGS. 7-9 and are further discussed herein in relation to such figures.

FIG. 7 illustrates a schematic diagram of a comparator, such as comparator 614 or comparator 616, in the low frequency signal detector 410. The comparator 614/616 is used to compare the differential inputs DINP 638 and DINN 640 against the internal reference voltage at VREFP 644 and VREFN 646, in accordance with an embodiment of the present invention. The comparator 614/616 includes a number of transistors shown in brackets 700 and 702 that are used to adjust the reference current. An inverter 704 couples with node AVDD 622 and node AVSS 624 to provide an output at node pdcb 706, using the input at node pdc 708, in an inverted state. The transistors at 700 and 702 have nodes cb<1>710, cb<2>712, cb<3>714, D<1>716, D<2>718 and D<3>720 which couple with corresponding nodes on the encoder 620 as shown in FIG. 9 to produce the results shown in the table of FIG. 6 having the truth table for input node 632 and Iref. The comparators 614 and 616 also include inputs at nodes VNBS 630 to provide a bias voltage that is used to tune the comparator 614/616.

FIG. 8 illustrates a schematic diagram of the reference voltage generator 618 of FIG. 6 in accordance with an embodiment of the present invention. The generator 618 couples to node AVDD 622, node AVSS 624, node VNBS 630, node pdcb 706, and node pdc 708 (shown in FIG. 7). The generator 618 thus uses the voltage divider shown in bracket 800 along with the coupled biasing transistors to provide the output reference voltage at node 628.

FIG. 9 illustrates a schematic logic diagram of the encoder 620 of FIG. 6 for the internal reference voltage adjustment in accordance with an embodiment of the present invention. This logic uses the inputs b<0> and b<1> through associated NAND, NOR and NOT gates to provide outputs D<1>716, D<2>718 and D<3>720 from nodes cb<1>710, cb<2>712 and cb<3>714, respectively (e.g., in accordance with the truth table also shown in FIG. 9) to perform the voltage bias control using gates of transistors 700 and 702 to tune the biasing of the comparators 614 and 616.

Accordingly, it should be understood that in an embodiment, when the amplitude of the differential input signals DINP1 638 and DINN1 640 are greater than the internal reference voltage provide by the generator 618, the outputs DOUTCP 642 and DOUTCN 643 of comparators 614 and 616, respectively, exhibit logic high states. Accordingly, the low frequency detect signal 412 also exhibits a logic high state to indicate that the low frequency state (e.g., state 304) has been detected. On the other hand, when the amplitude of the differential input signals at nodes DINP 404 and DINN 406 are below the internal reference voltage provided by the generator 618, the outputs DOUTCP 642 and DOUTCN 643 of comparators 614 and 616, respectively, exhibit logic low states. Accordingly, the low frequency detect signal 412 also exhibits a logic low state to clear the low frequency state detection.

FIG. 10 illustrates schematic diagram of the idle/high frequency signal detector 502 of FIG. 5 in accordance with an embodiment of the present invention. The idle/high frequency signal detector 502 includes a voltage divider circuit 1000. The voltage divider circuit 1000 receives a differential communication signal, such as that shown in graph 300 of FIG. 3, at input nodes RXp 404 and RXm 406. The voltage divider circuit 1000 provides a common mode voltage signal Cm at node 1002, from the input differential signal.

A source follower circuit 1006, coupled to nodes 622 and 624, receives the common mode voltage signal at node 1002. A current mirror circuit is provided by a pair of transistors coupled at nodes 624 and provides a current source to bias the current mirror circuit 1006. The current mirror circuit 1006 couples to a low pass filter 1008. The low pass filter 1008 couples to an input of a comparator 1016 at node 1012. The output signal of the source follower circuit 1006 and the low pass filter circuit 1008 at node 1012 indicates a strength of the common mode voltage signal Cm. In source follower circuit 1006, differential pairs of transistors are to be matched for proper circuit biasing A rectifier circuit 1004, coupled to nodes 622 and 624, receives the differential communication signal at nodes RXp 404 and RXm 406. A current mirror circuit is provided by a pair of transistors coupled at nodes 624 and provides a current source to bias the rectifier circuit 1004. The rectifier circuit 1004 couples to a low pass filter 1010. The low pass filter 1010 couples to an input of the comparator 1016 at node 1014. The output signal of the rectifier circuit 1004 and the low pass filter circuit 1010 at node 1014 indicates a strength of the differential communication signal provided at nodes RXp 404 and RXm 406. In rectifier circuit 1004, differential pairs of transistors are to be matched for proper circuit biasing.

The comparator 1016 has two bits (e.g., inputs at nodes 1012 and 1014) to control a pre-defined threshold level. If the differential signal at nodes RXp 404 and RXm 406 exhibits a large differential voltage, then comparator 1016 will output a logic high value for high frequency detect signal 504 to indicate that system 100 is receiving a communication signal in the high frequency state (e.g., state 308). On the other hand, if the nodes RXp 404 and the RXm 406 exhibit a very small or zero differential voltage (e.g., the outputs of the source follower circuit 1006 and the rectifier circuit 1010 at nodes 1012 and 1014, respectively, are very close to each another), the comparator 1016 will output a logic low value for high frequency detect signal 504 to indicate that system 100 is receiving a communication signal in the idle state (e.g., state 306).

FIG. 10 also shows a current biasing circuit 1018. The current biasing circuit 1018 couples to node pdc 708. The current biasing circuit 1018 provides a reference voltage to the tail current biasing circuits, such as that used for the source follower circuit 1006 and the rectifier circuit 1004.

As should be understood, the circuits provided in FIG. 10 compare a rectified signal obtained from the communication signal with a common mode voltage signal obtained from the communication signal. If the amplitude of the rectified differential signal is substantially similar to the amplitude of the common mode voltage signal, the idle/high frequency signal detector 502 outputs the high frequency detect signal 504 as a logic low value to indicate that the communication signal is in an idle state (e.g., state 306). On the other hand, if the amplitude of the rectified differential signal is greater than (e.g., not substantially similar to) the amplitude of the common mode voltage signal, then the idle/high frequency signal detector 502 outputs thedligh frequency detect signal 504 as a logic high value to indicate that the communication signal is in a high frequency state (e.g., state 308). For example, in one embodiment, a logic high value may correspond to an input signal amplitude above approximately 200 mV, and a logic low value may correspond to an input signal amplitude below approximately 200 mV or an electrical idle signal.

In light of the above, it should be clear to a person having ordinary skill in the art that systems and methods are provided herein to detect whether a communication signal, such as a USB 3.0 signal, is in an idle state (e.g., 306), a low frequency state (e.g., 304) or a high frequency state (e.g., 308). It contemplated that components shown in the figures that are not described herein and their related operation should be readily apparent to those having ordinary skill in the art. It is also contemplated that specific values for components may vary and that differential pairs of components should be matched for proper operation.

Embodiments described above illustrate but do not limit the invention. It should also be understood that numerous modifications and variations are possible in accordance with the principles of the present invention. Accordingly, the scope of the invention is defined only by the following claims.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of detecting a state of a signal, the method comprising:

receiving a differential communication signal comprising a positive portion and a complementary negative portion;

generating a common mode voltage signal from the positive portion and the negative portion of the communication signal;

rectifying the positive portion and the negative portion of the communication signal to provide a rectified signal;

comparing the common mode voltage signal with the rectified signal;

generating a high frequency detect signal in response to the comparing; and determining whether the communication signal is in an idle state or a high frequency state based on the high frequency detect signal.

2. The method of claim 1, wherein the high frequency detect signal exhibits a first value if the communication signal is in an idle state, and a second value if the communication signal is in a high frequency state.

3. The method of claim 2, wherein the high frequency detect signal exhibits the first value if an amplitude of the rectified signal is substantially similar to an amplitude of the common mode voltage signal.

4. The method of claim 2, wherein the high frequency detect signal exhibits the second value if an amplitude of the rectified signal is not substantially similar to an amplitude of the common mode voltage signal.

5. The method of claim 1, wherein the high frequency state corresponds to a data rate of approximately 5 Gbps.

6. The method of claim 1, further comprising generating a low frequency detect signal to indicate whether the communication signal is in a low frequency state.

7. The method of claim 6, further comprising determining that the communication signal is not in the low frequency state.

8. The method of claim 6, wherein the low frequency state corresponds to a frequency range of approximately 10 MHz to approximately 50 MHz.

9. The method of claim 6, wherein the communication signal is a universal serial bus (USB) 3.0 signal.

10. The method of claim 9, wherein the low frequency state is a low frequency periodic signaling (LFPS) state of the communication signal.

11. The method of claim 9, wherein the high frequency state corresponds to a Super Speed state of the communication signal.

12. A device adapted to detect a state of a signal, the device comprising:

nodes adapted to receive a differential communication signal comprising a positive portion and a complementary negative portion;

a voltage divider circuit adapted to generate a common mode voltage signal from the positive portion and the negative portion of the communication signal;

a rectifier circuit adapted to rectify the positive portion and the negative portion of the communication signal to provide a rectified signal; and a comparator adapted to perform a comparison between the common mode voltage signal and the rectified signal, and adapted to generate a high frequency detect signal in response to the comparison to indicate whether the communication signal is in an idle state or a high frequency state.

13. The device of claim 12, wherein the high frequency detect signal exhibits a first value if the communication signal is in an idle state, and a second value if the communication signal is in a high frequency state.

14. The device of claim 13, wherein the high frequency detect signal exhibits the first value if an amplitude of the rectified signal is substantially similar to an amplitude of the common mode voltage signal.

15. The device of claim 13, wherein the high frequency detect signal exhibits the second value if an amplitude of the rectified signal is not substantially similar to an amplitude of the common mode voltage signal.

16. The device of claim 12, wherein the high frequency state corresponds to a data rate of approximately 5 Gbps.

17. The device of claim 12, wherein the device is adapted to generate a low frequency detect signal to indicate whether the communication signal is in a low frequency state.

18. The device of claim 17, wherein the device is adapted to determine that the communication signal is not in the low frequency state.

19. The device of claim 17, wherein the low frequency state corresponds to a frequency range of approximately 10 MHz to approximately 50 MHz.

20. The device of claim 17, wherein the communication signal is a universal serial bus (USB) 3.0 signal.

21. The device of claim 20, wherein the low frequency state is a low frequency periodic signaling (LFPS) state of the communication signal.

22. The device of claim 20, wherein the high frequency state corresponds to a Super Speed state of the communication signal.

* * * * *